(12) United States Patent
Kamigawa et al.

(10) Patent No.: US 11,721,828 B2
(45) Date of Patent: Aug. 8, 2023

(54) APPARATUS FOR MANUFACTURING LAMINATED ELECTRODE BODY

(71) Applicant: Murata Manufacturing Co., Ltd., Nagaokakyo (JP)

(72) Inventors: Hideyasu Kamigawa, Nagaokakyo (JP); Takeshi Yamamoto, Nagaokakyo (JP); Masayuki Sumita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 425 days.

(21) Appl. No.: 16/989,053

(22) Filed: Aug. 10, 2020

(65) Prior Publication Data

US 2020/0373606 A1 Nov. 26, 2020

Related U.S. Application Data

(63) Continuation of application No. PCT/JP2018/047608, filed on Dec. 25, 2018.

(30) Foreign Application Priority Data

Feb. 15, 2018 (JP) .................................. 2018-025307

(51) Int. Cl.
*H01M 10/04* (2006.01)
(52) U.S. Cl.
CPC ..... *H01M 10/0404* (2013.01); *H01M 10/049* (2013.01)
(58) Field of Classification Search
CPC .. Y02P 70/50; H01M 10/0404; H01M 10/049
See application file for complete search history.

(56) References Cited

U.S. PATENT DOCUMENTS

2015/0002038 A1   1/2015   Wan et al.

FOREIGN PATENT DOCUMENTS

| JP | 2009206046 A | 9/2009 |
| JP | 2014127273 A | 7/2014 |

(Continued)

OTHER PUBLICATIONS

International Search Report Issued for PCT/JP2018/047608, dated Apr. 9, 2019.

(Continued)

*Primary Examiner* — Brian R Ohara
*Assistant Examiner* — Patrick Marshall Greene
(74) *Attorney, Agent, or Firm* — ArentFox Schiff LLP (57) ABSTRACT

An apparatus for manufacturing a laminated electrode body that includes a laminating unit having a rotatable cross arm, a first transport head and a third transport head at a first distance from a rotation center of the cross arm and a second transport head and a fourth transport head at a second distance shorter than the first distance from the rotation center; a positive electrode supply stage that includes a first positive electrode mounting table at the first distance and a second positive electrode mounting table at the second distance from the rotation center; a negative electrode supply stage that includes a first negative electrode mounting table at the first distance and a second negative electrode mounting table at the second distance from the rotation center; a first laminating stage at the first distance from the rotation center; and a second laminating stage at the second distance.

7 Claims, 8 Drawing Sheets

(56) References Cited

FOREIGN PATENT DOCUMENTS

| | | |
|---|---|---|
| JP | 5666805 A | 2/2015 |
| JP | 2017004615 A | 1/2017 |
| WO | 2013145783 A1 | 10/2013 |

OTHER PUBLICATIONS

Written Opinion of the International Searching Authority issued for PCT/JP2018/047608, dated Apr. 9, 2019.

A: POSITIVE ELECTRODE SUCTION
B: NEGATIVE ELECTRODE MOUNTING
C: NEGATIVE ELECTRODE SUCTION
D: POSITIVE ELECTRODE MOUNTING

FIG. 8(b)

A: POSITIVE ELECTRODE MOUNTING
B: NEGATIVE ELECTRODE SUCTION
C: NEGATIVE ELECTRODE MOUNTING
D: POSITIVE ELECTRODE SUCTION

FIG. 8(c)

A: POSITIVE ELECTRODE SUCTION
B: NEGATIVE ELECTRODE MOUNTING
C: NEGATIVE ELECTRODE SUCTION
D: POSITIVE ELECTRODE MOUNTING

APPARATUS FOR MANUFACTURING LAMINATED ELECTRODE BODY

CROSS REFERENCE TO RELATED APPLICATIONS

The present application is a continuation of International application No. PCT/JP2018/047608, filed Dec. 25, 2018, which claims priority to Japanese Patent Application No. 2018-025307, filed Feb. 15, 2018, the entire contents of each of which are incorporated herein by reference.

FIELD OF THE INVENTION

The present invention relates to an apparatus for manufacturing a laminated electrode body having a structure in which positive electrodes and negative electrodes are alternately laminated with separators interposed therebetween.

BACKGROUND OF THE INVENTION

Apparatuses for manufacturing a laminated electrode body by alternately laminating positive electrodes and negative electrodes with separators interposed therebetween have been known.

As one of the apparatuses for manufacturing a laminated electrode body, Patent Document 1 describes an apparatus of alternately laminating positive electrodes and negative electrodes with separators interposed therebetween by using a cross arm having four suction heads arranged at intervals of 90° on the same circumference.

Figure 8A:
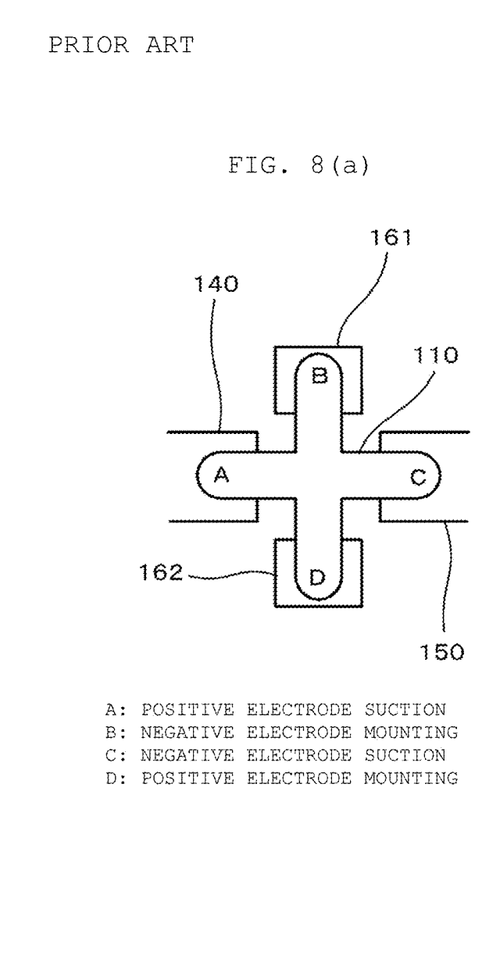
FIGS. 8(a) to 8(c) are diagrams for describing an operation of an apparatus of the related art for forming a laminated electrode body on two trays by using a cross arm having four suction heads.
Figure 8B:
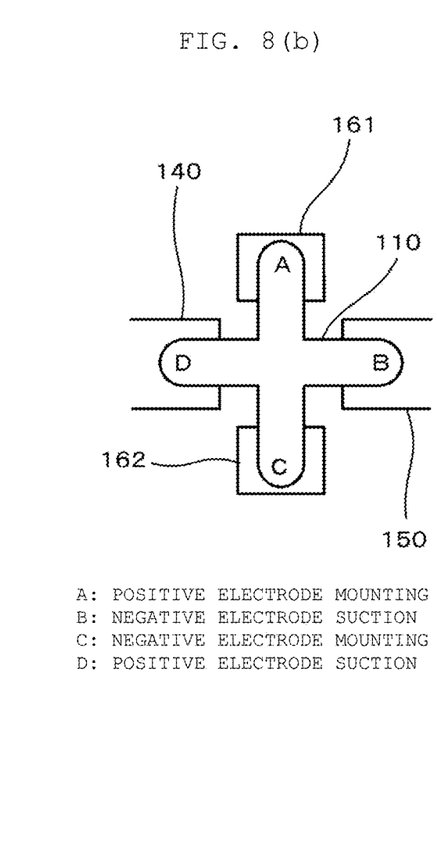
Figure 8C:
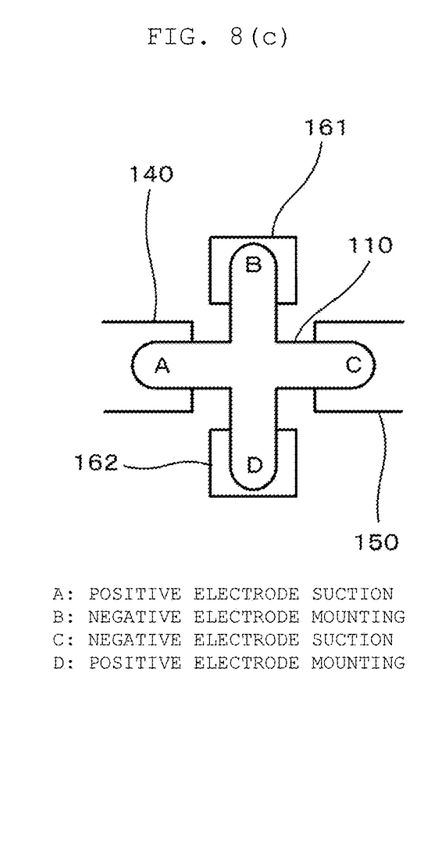

FIGS. 8(a) to 8(c) are diagrams for describing an operation of the laminating apparatus described in Patent Document 1. A suction head A of a cross arm 110 sucks a positive electrode supplied by a positive electrode supply device 140, and a suction head C at a position facing the suction head A sucks a negative electrode supplied by a negative electrode supply device 150 (FIG. 8(a)). The positive electrode has a structure of being sandwiched between two separators.

Subsequently, the cross arm 110 rotates forward by 90° (FIG. 8(b)). The suction head A mounts the sucked positive electrode on a first tray 161 positioned on an upper side in the drawing, and the suction head C mounts the sucked negative electrode on a second tray 162 positioned on a lower side in the drawing. A suction head D sucks the positive electrode supplied by the positive electrode supply device 140, and a suction head B positioned at a position facing the suction head D sucks the negative electrode supplied by the negative electrode supply device 150.

Subsequently, the cross arm 110 rotates in reverse by 90° (FIG. 8(c)). The suction head D mounts the sucked positive electrode on the second tray 162, and the suction head B mounts the sucked negative electrode on the first tray 161. The suction head A sucks the positive electrode supplied by the positive electrode supply device 140, and the suction head C sucks the negative electrode supplied by the negative electrode supply device 150.

A laminated electrode body in which the positive electrodes and the negative electrodes are alternately laminated with the separators interposed therebetween is formed on the first tray 161 and the second tray 162 by repeating the above-described operations.

Patent Document 1: Patent No. 5666805

SUMMARY OF THE INVENTION

However, in the laminating apparatus described in Patent Document 1, since the laminated electrode body is formed on the two trays 161 and 162 by the cross arm, electrode supply capacities of the positive electrode supply device 140 and the negative electrode supply device 150 need to be twice that of a configuration in which the laminated electrode body is formed on one tray. When the electrode supply capacities of the positive electrode supply device 140 and the negative electrode supply device 150 are not twice, it is not possible to obtain manufacturing capacity twice that of the configuration in which the laminated electrode body is formed on one tray.

The present invention has been made in order to solve the above problems, and an object of the present invention is to provide a technology capable of improving manufacturing efficiency of a laminated electrode body in an apparatus for forming a laminated electrode body on two laminating stages.

An apparatus for manufacturing a laminated electrode body according to the present invention is an apparatus for manufacturing a laminated electrode body having a structure in which positive electrodes and negative electrodes are alternately laminated with separators interposed therebetween. The apparatus includes a laminating unit that includes a rotatable cross arm having a rotation center, a first transport head positioned at a first distance from the rotation center of the cross arm, a second transport head facing the first transport head with the rotation center interposed therebetween and positioned at a second distance shorter than the first distance from the rotation center, a third transport head arranged 90° around the rotation center relative to the first transport head and positioned at the first distance from the rotation center, and a fourth transport head facing the third transport head with the rotation center interposed therebetween and positioned at the second distance from the rotation center; a positive electrode supply stage that includes a first positive electrode mounting table positioned at the first distance from the rotation center of the cross arm when the positive electrode supply stage is positioned at a positive electrode supply position, and a second positive electrode mounting table positioned at the second distance from the rotation center of the cross arm when the positive electrode supply stage is positioned at the positive electrode supply position; a negative electrode supply stage that includes a first negative electrode mounting table positioned at the first distance from the rotation center of the cross arm when the negative electrode supply stage is positioned at a negative electrode supply position, and a second negative electrode mounting table positioned at the second distance from the rotation center of the cross arm when the negative electrode supply stage is positioned at the negative electrode supply position; a first laminating stage positioned at the first distance relative to the rotation center of the cross arm, and a second laminating stage facing the first laminating stage with the rotation center of the cross arm interposed therebetween and positioned at the second distance relative to the rotation center of the cross arm. The laminating unit is configured such that after the first transport head picks up a first positive electrode on the first positive electrode mounting table and the second transport head picks up a second negative electrode on the second negative electrode mounting table, the cross arm rotates by 90° in a first direction, the first transport head mounts the first positive electrode on the first laminating stage, and the second transport head mounts the second negative electrode on the second laminating stage. The laminating unit is further configured such that after the third transport head picks up a first negative electrode on the first negative electrode mounting table and the fourth transport head picks up a second positive electrode on the second positive electrode mounting table at positions where the first transport head mounts the first positive electrode on the first laminating stage and the second transport head mounts the second negative electrode on the second laminating stage, the cross arm rotates by 90° in a second direction opposite to the first direction, the third transport head mounts the first negative electrode on the first laminating stage, and the fourth transport head mounts the second positive electrode on the second laminating stage.

The apparatus for manufacturing the laminated electrode body may further include a first image pickup unit that captures the first positive electrode mounted on the first positive electrode mounting table and the second positive electrode mounted on the second positive electrode mounting table, and a second image pickup unit that captures the first negative electrode mounted on the first negative electrode mounting table and the second negative electrode mounted on the second negative electrode mounting table. The first laminating stage may be configured to be movable in at least one of a horizontal direction and a rotation direction based on an image of the first positive electrode mounted on the first positive electrode mounting table captured by the first image pickup unit and based on an image of the first negative electrode mounted on the first negative electrode mounting table captured by the second image pickup unit, and the second laminating stage may be configured to be movable in at least one of the horizontal direction and the rotation direction based on an image of the second positive electrode mounted on the second positive electrode mounting table captured by the first image pickup unit and an image of the second negative electrode mounted on the second negative electrode mounting table captured by the second image pickup unit.

The positive electrode supply stage may include a first light irradiation mechanism that applies light from below the first and second positive electrodes mounted on the first and second positive electrode mounting tables, the negative electrode supply stage may include a second light irradiation mechanism that applies light from below the first and second negative electrodes mounted on the first and second negative electrode mounting tables. The first image pickup unit may be arranged above the positive electrode supply stage, and the second image pickup unit may be arranged above the negative electrode supply stage.

One of the first positive electrode mounted on the first positive electrode mounting table, the second positive electrode mounted on the second positive electrode mounting table, the first negative electrode mounted on the first negative electrode mounting table, and the second negative electrode mounted on the second negative electrode mounting table may have a structure of being sandwiched between a pair of separators.

The first and second positive electrodes mounted on the first positive electrode mounting table and the second positive electrode mounting table may each have a structure that includes a separator arranged on a first main surface thereof, and the first and second negative electrodes mounted on the first negative electrode mounting table and the second negative electrode mounting table may each have a structure that includes a separator arranged on the first main surface thereof.

At least one of the first and second positive electrodes or the first and second negative electrodes can be single-sided electrodes having an electrode active material layer provided only on one surface of an electrode current collector, and these single-sided electrodes may be electrodes that are initially supplied and electrodes that are finally supplied to the first laminating stage and the second laminating stage from at least one of the positive electrode supply stage and the negative electrode supply stage.

The positive electrode supply stage may include three or more sets of the first positive electrode mounting tables and the second positive electrode mounting tables, and may be configured to rotate each of the three or more sets of the first positive electrode mounting tables and the second positive electrode mounting tables to the positive electrode supply position when the positive electrodes are mounted thereon, and the negative electrode supply stage may include three or more sets of the first negative electrode mounting tables and the second negative electrode mounting tables, and may be configured to rotate each of the three or more sets of the first negative electrode mounting tables and the second negative electrode mounting tables to the negative electrode supply position when the negative electrodes are mounted thereon.

In the apparatus for manufacturing the laminated electrode body according to the present invention, the laminating unit includes the first transport head and the third transport head which are at the positions of the first distance from the rotation center of the cross arm and the second transport head and the fourth transport head which are at the positions of the second distance. The positive electrode supply stage includes the first positive electrode mounting table positioned at the first distance and the second positive electrode mounting table which is at the position of the second distance from the rotation center of the cross arm. The negative electrode supply stage includes the first negative electrode mounting table positioned at the first distance and the second negative electrode mounting table positioned at the second distance from the rotation center of the cross arm.

The laminating unit is configured such that after the first transport head picks up the first positive electrode on the first positive electrode mounting table and the second transport head picks up the second negative electrode on the second negative electrode mounting table, the cross arm rotates by 90° in the first direction, the first transport head mounts the first positive electrode on the first laminating stage, and the second transport head mounts the second negative electrode on the second laminating stage, and the laminating unit is configured such that the third transport head picks up the first negative electrode on the first negative electrode mounting table and the fourth transport head picks up the second positive electrode on the second positive electrode mounting table at the position where the first transport head mounts the first positive electrode.

With the aforementioned configuration, since the positive electrode supply stage can supply two positive electrodes and the negative electrode supply stage can supply two negative electrodes and the laminated electrode body can be formed on the two laminating stages of the first laminating stage and the second laminating stage, the manufacturing efficiency of the laminated electrode body can be improved.

DETAILED DESCRIPTION OF THE INVENTION

Hereinafter, embodiments of the present invention will be described, and features of the present invention will be specifically described.

First, a structure of a laminated electrode body manufactured by an apparatus for manufacturing a laminated electrode body will be described. The laminated electrode body is used, for example, for a battery such as a lithium ion battery.

Figure 1:
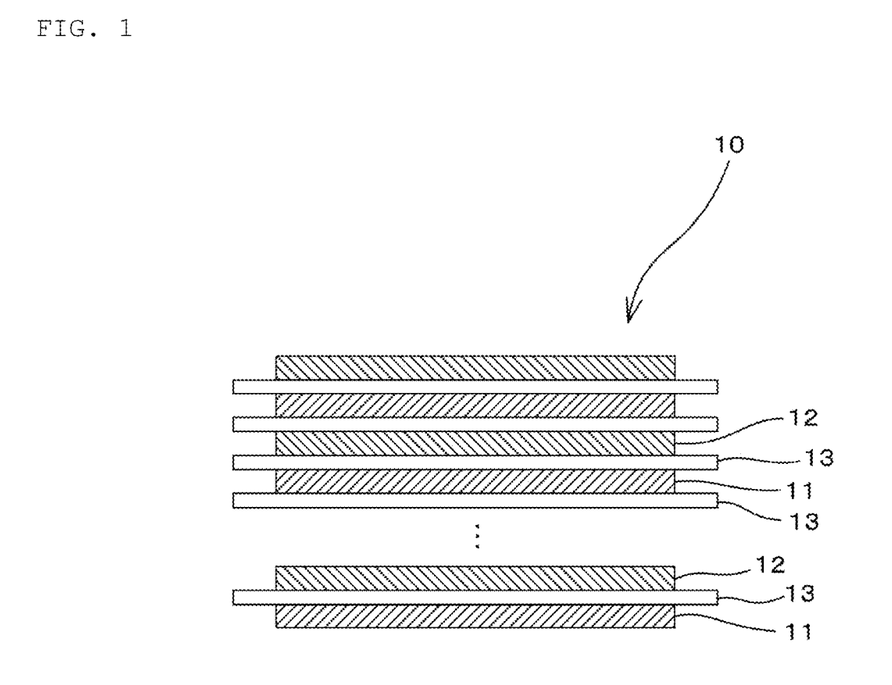
FIG. 1 is a cross-sectional view illustrating a structure of a laminated electrode body.

FIG. 1 is a cross-sectional view illustrating a structure of a laminated electrode body 10. The laminated electrode body 10 has a structure in which a plurality of positive electrodes 11 and a plurality of negative electrodes 12 are alternately laminated with separators 13 interposed therebetween.

The positive electrode 11 includes a positive electrode current collector made of a metal foil such as aluminum, and positive electrode active material layers formed on both surfaces of the positive electrode current collector. The positive electrode active material layer may contain, for example, lithium cobalt oxide as a positive electrode active material. When the electrode positioned on the outermost side of the laminated electrode body 10 in a laminated direction is the positive electrode, the positive electrode positioned on the outermost side may have a configuration in which the positive electrode active material layer is formed only on one surface of the positive electrode current collector.

The negative electrode 12 includes a negative electrode current collector made of a metal foil such as copper, and negative electrode active material layers formed on both surfaces of the negative electrode current collector. The negative electrode active material layer may contain, for example, graphite as a negative electrode active material. When the electrode positioned on the outermost side of the laminated electrode body 10 in the laminated direction is the negative electrode, the negative electrode positioned on the outermost side may have a configuration in which the negative electrode active material layer is formed only on one surface of the negative electrode current collector. A shape and a size of the negative electrode 12 may be the same as or different from a shape and a size of the positive electrode 11.

The separator 13 may be formed by, for example, a microporous thin film made of polypropylene having excellent insulating properties.

The structure of the laminated electrode body 10 is not limited to the aforementioned structure, and may be, for example, a structure in which unit electrode bodies each having a structure in which one electrode of the positive electrode 11 and the negative electrode 12 is packaged by two separators 13 and the other electrodes are alternately laminated.

First Embodiment

Figure 2:
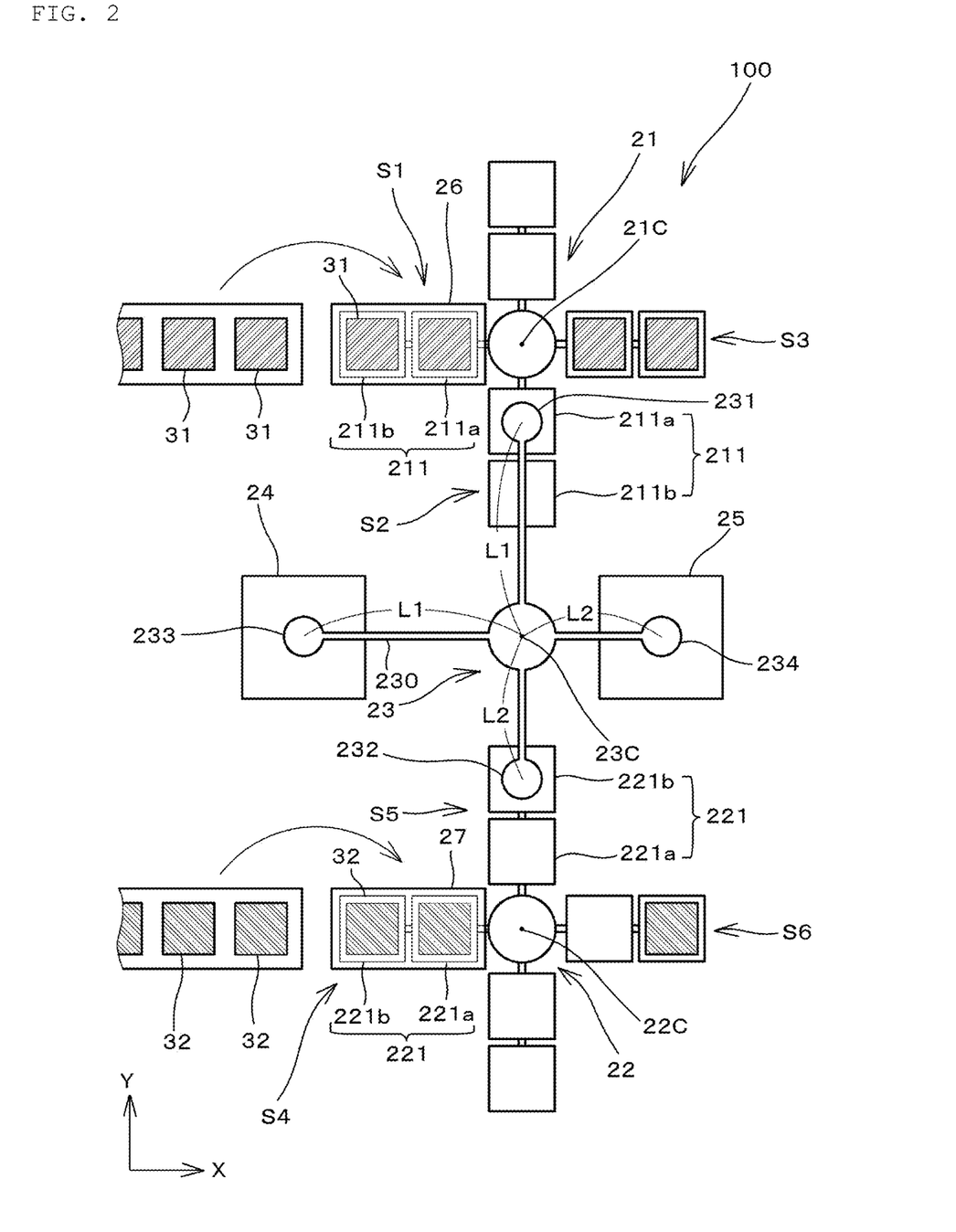
FIG. 2 is a plan view illustrating a configuration of an apparatus for manufacturing a laminated electrode body according to a first embodiment.

FIG. 2 is a plan view illustrating a configuration of an apparatus 100 for manufacturing a laminated electrode body according to a first embodiment. The apparatus 100 for manufacturing a laminated electrode body according to the first embodiment includes a positive electrode supply stage 21, a negative electrode supply stage 22, a laminating unit 23, a first laminating stage 24, and a second laminating stage 25.

The positive electrode supply stage 21 includes four sets of positive electrode mounting tables 211 each including a first positive electrode mounting table 211a and a second positive electrode mounting table 211b. The four sets of positive electrode mounting tables 211 are arranged around a rotation center 21C at intervals of 90°, and are configured to be rotatable around the rotation center 21C.

In the present embodiment, positive electrodes 31 are mounted on the positive electrode mounting table 211 at a positive electrode mounting position S1, and the positive electrodes 31 are picked up from the positive electrode mounting table 211 by the laminating unit 23 to be described below at a positive electrode supply position S2 which is a position rotated from the positive electrode mounting position S1 by 90° in a direction opposite to a clockwise direction.

When the positive electrodes 31 are mounted on the first positive electrode mounting table 211a and the second positive electrode mounting table 211b at the positive electrode mounting position S1, respectively, the mounted positive electrodes 31 are captured by a first image pickup unit 26 to be described below. As will be described below, positions and inclinations of the positive electrodes 31 are corrected based on the captured image, but when the positive electrodes 31 are determined to be defective products based on the captured image, the positive electrode mounting table 211 on which the positive electrodes 31 determined to be the defective products are mounted is retracted to a positive electrode retracted position S3. The positive electrode retracted position S3 is a position facing the positive electrode mounting position S1 with the rotation center 21C interposed therebetween. However, a position rotated from the positive electrode mounting position S1 by 90° in the clockwise direction may be the positive electrode retracted position.

Even while the positive electrode mounting table 211 on which the positive electrodes 31 determined to be the defective products are mounted is retracted to the positive electrode retracted position S3, the positive electrodes 31 can be picked up by the laminating unit 23 to be described below from the positive electrode mounting table 211 at the positive electrode supply position S2. Thus, the positive electrodes 31 as the defective products can be retracted to the positive electrode retracted position S3 without temporarily stopping the supply of the positive electrodes 31.

In the present embodiment, the positive electrode 31 has a structure of being packaged by the separators. That is, the positive electrode 31 is sandwiched between two separators arranged on a first main surface and a second main surface, and has a structure in which the two separators are bonded around the positive electrode. The separators can also be simultaneously laminated by alternately laminating the positive electrodes 31 each having such a structure and the negative electrodes 32, and thus, manufacturing efficiency is improved.

A method of producing the positive electrodes 31 each having the structure of being sandwiched between two separators arranged on the first main surface and the second main surface will be described below.

When the positive electrode mounting table 211 is positioned at the positive electrode supply position S2, a distance between the first positive electrode mounting table 211a and a rotation center 23C of a cross arm 230 of the laminating unit 23 to be described below is a first distance L1. A distance between the second positive electrode mounting table 211b and the rotation center 23C of the cross arm 230 is a second distance L2. The second distance L2 is shorter than the first distance L1.

The positive electrode supply stage 21 has a light irradiation mechanism that applies light from below the positive electrodes 31 mounted on the first positive electrode mounting table 211a and the second positive electrode mounting table 211b.

The negative electrode supply stage 22 includes four sets of negative electrode mounting tables 221 each including a first negative electrode mounting table 221a and a second negative electrode mounting table 221b. The four sets of negative electrode mounting tables 221 are arranged around a rotation center 22C at intervals of 90°, and are configured to be rotatable around the rotation center 22C.

In the present embodiment, the negative electrodes 32 are mounted on the negative electrode mounting table 221 at a negative electrode mounting position S4, and the negative electrodes 32 are picked up from the negative electrode mounting table 221 by the laminating unit 23 to be described below at a negative electrode supply position S5 which is a position rotated from the negative electrode mounting position S4 by 90° in the clockwise direction.

When the negative electrodes 32 are mounted on the first negative electrode mounting table 221a and the second negative electrode mounting table 221b at the negative electrode mounting position S4, respectively, the mounted negative electrodes 32 are captured by a second image pickup unit 27 to be described below. As will be described below, positions and inclinations of the negative electrodes 32 are corrected based on the captured image, but when the negative electrodes 32 are determined to be defective products based on the captured image, the negative electrode mounting table 221 on which the negative electrodes 32 determined to be defective products are mounted is retracted to a negative electrode retracted position S6. The negative electrode retracted position S6 is a position facing the negative electrode mounting position S4 with the rotation center 22C interposed therebetween. However, a position rotated from the negative electrode mounting position S4 by 90° in the direction opposite to the clockwise direction may be set as the negative electrode retracted position.

Even while the negative electrode mounting table 221 on which the negative electrodes 32 determined to be the defective products are mounted is retracted to the negative electrode retracted position S6, the negative electrodes 32 can be picked up by the laminating unit 23 from the negative electrode mounting table 221 at the negative electrode supply position S5. Thus, the negative electrodes 32 as the defective products can be retracted to the negative electrode retracted position S6 without temporarily stopping the supply of the negative electrodes 32.

When the negative electrode mounting table 221 is positioned at the negative electrode supply position S5, a distance between the first negative electrode mounting table 221a and the rotation center 23C of the cross arm 230 of the laminating unit 23 is the first distance L1. A distance between the second negative electrode mounting table 221b and the rotation center 23C of the cross arm 230 is the second distance L2.

The negative electrode supply stage 22 has a light irradiation mechanism that applies light from below the negative electrodes 32 mounted on the first negative electrode mounting table 221a and the second negative electrode mounting table 221b.

The laminating unit 23 includes the cross arm 230, a first suction head (transport head) 231, a second suction head (transport head) 232, a third suction head (transport head) 233, and a fourth suction head (transport head) 234 which are attached to the cross arm 230. The cross arm 230 is configured to be rotatable around the rotation center 23C.

The first suction head 231 is positioned at a position facing the second suction head 232 with the rotation center 23C of the cross arm 230 interposed therebetween. The third suction head 233 is positioned at a position facing the fourth suction head 234 with the rotation center 23C of the cross arm 230 interposed therebetween. A line connecting the first suction head 231 and the second suction head 232 is orthogonal to a line connecting the third suction head 233 and the fourth suction head 234 at the rotation center 23C.

The first suction head 231 and the third suction head 233 are positioned at the first distance L1 from the rotation center 23C. The second suction head 232 and the fourth suction head 234 are positioned at the second distance L2 from the rotation center 23C.

Figure 3:
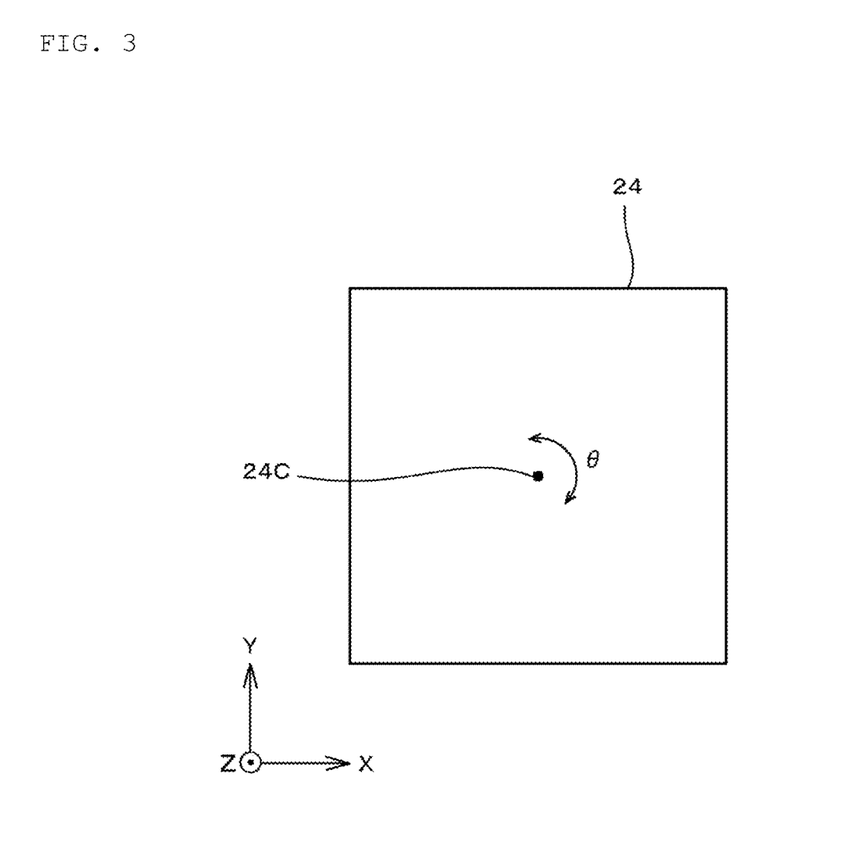
FIG. 3 is a diagram for describing a direction in which a first laminating stage is movable.

The first laminating stage 24 is positioned at a position of the first distance L1 from the rotation center 23C of the cross arm 230. The first laminating stage 24 is configured to be movable in a horizontal direction and a rotation direction. More specifically, the first laminating stage 24 is configured to be movable in an X-axis direction, a Y-axis direction, and in a θ direction which is a rotation direction of the first laminating stage 24 around a central axis 24C as illustrated in FIG. 3. The first laminating stage 24 is also configured to be movable in a Z-axis direction which is a vertical direction.

The second laminating stage 25 is at a position facing the first laminating stage 24 with the rotation center 23C of the cross arm 230 interposed therebetween and is at a position of the second distance L2 from the rotation center 23C of the cross arm 230. The second laminating stage 25 is also configured to be movable in the X-axis direction, the Y-axis direction, and the θ direction that is the rotation direction of the second laminating stage 25 around a central axis. The second laminating stage 25 is also configured to be movable in the Z-axis direction which is the vertical direction.

The laminated electrode body 10 is formed by alternately laminating the positive electrodes 31 and the negative electrodes 32 with the separators interposed therebetween on the first laminating stage 24 and the second laminating stage 25 by a method to be described below.

The first image pickup unit 26 captures the positive electrode 31 on the first positive electrode mounting table 211a and the positive electrode 31 on the second positive electrode mounting table 211b positioned at the positive electrode mounting position S1 in order to recognize the positions and inclinations of the positive electrodes 31.

Since it is necessary to recognize the positions and inclinations of the positive electrodes 31, not the whole positive electrode 31 but a part thereof, for example, only an end portion may be captured.

When the first image pickup unit 26 captures the positive electrodes 31, the light irradiation mechanism of the positive electrode supply stage 21 applies light from below the positive electrodes 31. That is, the first image pickup unit 26 captures the positive electrodes 31 from above in a state in which the light is applied from below the positive electrodes 31 mounted on the first positive electrode mounting table 211a and the second positive electrode mounting table 211b. Accordingly, the positive electrodes 31 each having the structure of being sandwiched between the separators can be reliably captured.

The second image pickup unit 27 captures the negative electrode 32 on the first negative electrode mounting table 221a and the negative electrode 32 on the second negative electrode mounting table 221b positioned at the negative electrode mounting position S4 in order to recognize the positions and inclinations of the negative electrodes 32. When the second image pickup unit 27 captures the negative electrodes 32, the light irradiation mechanism of the negative electrode supply stage 22 applies light from below the negative electrodes 32. Since it is necessary to recognize the positions and inclinations of the negative electrodes 32, not the whole negative electrode 32 but a part thereof, for example, only an end portion may be captured.

As illustrated in FIG. 2, when the first suction head 231 of the laminating unit 23 is positioned on the first positive electrode mounting table 211a at the positive electrode supply position S2, the second suction head 232 is positioned on the second negative electrode mounting table 221b at the negative electrode supply position S5. At this time, the third suction head 233 is positioned on the first laminating stage 24, and the fourth suction head 234 is positioned on the second laminating stage 25.

FIGS. 4(a) to 4(c) are diagrams for describing a laminated electrode body manufacturing operation performed by the apparatus 100 for manufacturing a laminated electrode body according to the present embodiment.

The first suction head 231 of the cross arm 230 sucks the positive electrode 31 on the first positive electrode mounting table 211a at the positive electrode supply position S2, and the second suction head 232 sucks the negative electrode 32 on the second negative electrode mounting table 221b at the negative electrode supply position S5 (FIG. 4(a)).

The third suction head 233 mounts the sucked negative electrode 32 on the first laminating stage 24. The fourth suction head 234 mounts the sucked positive electrode 31 on the second laminating stage 25 (FIG. 4(a)). Thereafter, the first laminating stage 24 is lowered by a thickness of the mounted negative electrode 32, and the second laminating stage 25 is lowered by a thickness of the mounted positive electrode 31.

Subsequently, the cross arm 230 rotates by 90° in the direction (first direction) opposite to the clockwise direction. Accordingly, the first suction head 231 moves onto the first laminating stage 24 in a state of sucking the positive electrode 31, and the second suction head 232 moves onto the second laminating stage 25 in a state of sucking the negative electrode 32. The third suction head 233 moves onto the first negative electrode mounting table 221a positioned at the negative electrode supply position S5, and the fourth suction head 234 moves onto the second positive electrode mounting table 211b positioned at the positive electrode supply position S2 (FIG. 4(b)).

The first laminating stage 24 moves to at least one direction of the X-axis direction, the Y-axis direction, and the θ direction based on the image of the positive electrode 31 on the first positive electrode mounting table 211a captured by the first image pickup unit 26. Accordingly, thereafter, the position and inclination of the positive electrode 31 mounted on the first laminating stage 24 can be corrected. However, when the positive electrode 31 is not displaced and inclined, the first laminating stage 24 does not move.

The second laminating stage 25 moves to at least one direction of the X-axis direction, the Y-axis direction, and the θ direction based on the image of the negative electrode 32 on the second negative electrode mounting table 221b captured by the second image pickup unit 27. Accordingly, thereafter, the position and inclination of the negative electrode 32 laminated on the second laminating stage 25 can be corrected. However, when the negative electrode 32 is not displaced and inclined, the second laminating stage 25 does not move.

When the movement of the first laminating stage 24 is completed, the first suction head 231 mounts the sucked positive electrode 31 on the first laminating stage 24. When the movement of the second laminating stage 25 is completed, the second suction head 232 mounts the sucked negative electrode 32 on the second laminating stage 25. Thereafter, the first laminating stage 24 is lowered by a thickness of the mounted positive electrode 31, and the second laminating stage 25 is lowered by a thickness of the mounted negative electrode 32.

The third suction head 233 sucks the negative electrode 32 on the first negative electrode mounting table 221a positioned at the negative electrode supply position S5, and the fourth suction head 234 sucks the positive electrode 31 on the second positive electrode mounting table 211b positioned at the positive electrode supply position S2.

Subsequently, the cross arm 230 rotates by 90° in the clockwise direction (second direction). The positive electrode mounting table 211 of the positive electrode supply stage 21 rotates by 90° in the direction opposite to the clockwise direction, and the negative electrode mounting table 221 of the negative electrode supply stage 22 rotates by 90° in the clockwise direction (FIG. 4(c)).

The positive electrode mounting table 211 of the positive electrode supply stage 21 rotates by 90° in the direction opposite to the clockwise direction, and thus, the positive electrode mounting table 211 positioned at the positive electrode mounting position S1 moves to the positive electrode supply position S2 in a state in which the positive electrodes 31 are mounted.

The negative electrode mounting table 221 of the negative electrode supply stage 22 rotates by 90° in the clockwise direction, and thus, the negative electrode mounting table 221 positioned at the negative electrode mounting position S4 in a state in which the negative electrodes 32 are mounted moves to the negative electrode supply position S5.

The cross arm 230 rotates by 90° in the clockwise direction (second direction) as illustrated in FIG. 4(c). Thus, the first suction head 231 moves onto the first positive electrode mounting table 211a positioned at the positive electrode supply position S2, and the second suction head 232 moves onto the second negative electrode mounting table 221b positioned at the negative electrode supply position S5. The third suction head 233 moves onto the first laminating stage 24 in a state of sucking the negative electrode 32, and the fourth suction head 234 moves onto the second laminating stage 25 in a state of sucking the positive electrode 31.

The first laminating stage 24 moves to at least one direction of the X-axis direction, the Y-axis direction, and the θ direction based on the image of the negative electrode 32 on the first negative electrode mounting table 221*a* captured by the second image pickup unit 27. Accordingly, thereafter, the position and inclination of the negative electrode 32 laminated on the first laminating stage 24 can be corrected. However, when the negative electrode 32 is not displaced and inclined, the first laminating stage 24 does not move.

The second laminating stage 25 moves to at least one direction of the X-axis direction, the Y-axis direction and the θ direction based on the image of the positive electrode 31 on the second positive electrode mounting table 211*b* captured by the first image pickup unit 26. Accordingly, thereafter, the position and inclination of the positive electrode 31 laminated on the second laminating stage 25 can be corrected. However, when the positive electrode 31 is not displaced and inclined, the second laminating stage 25 does not move.

As described above, the first laminating stage 24 and the second laminating stage 25 are configured to move in order to correct the positions and inclinations of the positive electrode 31 and the negative electrode 32. Accordingly, it is possible to simplify the configuration compared to a configuration in which four mounting tables of the first positive electrode mounting table 211*a*, the second positive electrode mounting table 211*b*, the first negative electrode mounting table 221*a*, and the second negative electrode mounting table 221*b* individually move in order to correct the positions and inclinations of the positive electrode 31 and the negative electrode 32.

Thereafter, the positive electrodes 31 are mounted on the first positive electrode mounting table 211*a* and the second positive electrode mounting table 211*b* positioned at the positive electrode mounting position S1, respectively. The first image pickup unit 26 captures the mounted positive electrodes 31 in a state in which the light irradiation mechanism of the positive electrode supply stage 21 applies light from below the mounted positive electrodes 31.

The negative electrodes 32 are mounted on the first negative electrode mounting table 221*a* and the second negative electrode mounting table 221*b* positioned at the negative electrode mounting position S4. The second image pickup unit 27 captures the mounted negative electrodes 32 in a state in which the light irradiation mechanism of the negative electrode supply stage 22 applies light from below the mounted negative electrodes 32.

Figure 4:
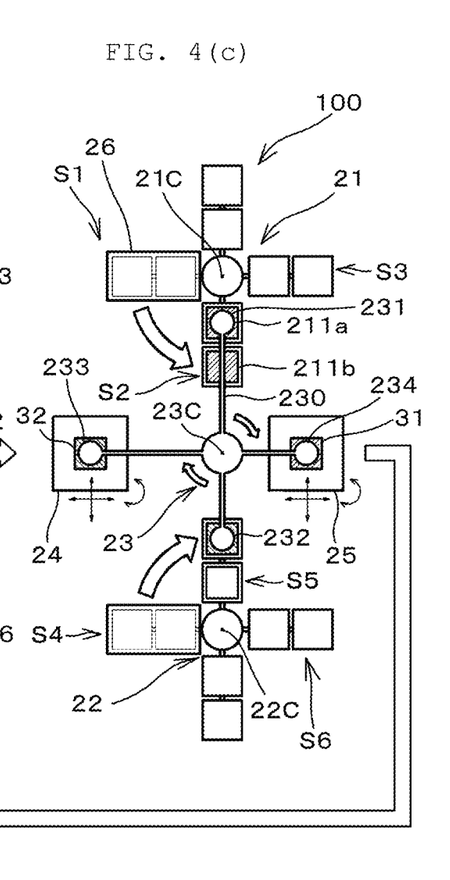
FIGS. 4(a) to 4(c) are diagrams for describing a manufacturing operation of the laminated electrode body by the apparatus for manufacturing a laminated electrode body according to the first embodiment.

Thereafter, the above-described operations, that is, the operations illustrated in FIGS. 4(*a*) to 4(*c*) are repeatedly performed. Accordingly, the laminated electrode body 10 is formed by alternately laminating the positive electrodes 31 each having the structure of being sandwiched between the separators arranged on both the main surfaces and the negative electrodes 32 on the first laminating stage 24 and the second laminating stage 25.

As described above, in the apparatus 100 for manufacturing a laminated electrode body according to the present embodiment, the positive electrode supply stage 21 includes the first positive electrode mounting table 211*a* and the second positive electrode mounting table 211*b*, and is configured to be able to supply two positive electrodes 31. The negative electrode supply stage 22 includes the first negative electrode mounting table 221*a* and the second negative electrode mounting table 221*b*, and is configured to be able to supply two negative electrodes 32. Accordingly, when the laminated electrode body 10 is formed on the two laminating stages of the first laminating stage 24 and the second laminating stage 25, since the electrode supply capacity can be matched with the laminated capacity, manufacturing efficiency of the laminated electrode body 10 can be improved.

As described above, when the positive electrode mounting table is positioned at the positive electrode supply position, the first positive electrode mounting table 211*a* is positioned at the position separated from the rotation center 23C of the cross arm 230 by the first distance L1, and the second positive electrode mounting table 211*b* is positioned at the position separated from the rotation center 23C of the cross arm 230 by the second distance L2. Among the four suction heads attached to the cross arm 230, the first suction head 231 and the third suction head 233 are at positions of the first distance L1 from the rotation center 23C, and the second suction head 232 and the fourth suction head 234 are at positions of the second distance L2 from the rotation center 23C. Accordingly, when the picking-up and mounting of the positive electrodes 31 are performed by repeating the rotation operation of the cross arm by 90°, since the picking-up of the positive electrode 31 mounted on the first positive electrode mounting table 211*a* and the picking-up of the second positive electrode 31 mounted on the second positive electrode mounting table 211*b* can be alternately and continuously performed, the picking-up and mounting of the positive electrodes 31 can be efficiently performed. The same applies to the negative electrode 32 side.

Here, the electrode positioned on the outermost side of the laminated electrode body 10 in the laminated direction may be a single-sided electrode in which the electrode active material layer is provided only on one side of the electrode current collector. The single-sided electrode is arranged on the outermost side of the laminated electrode body 10, and thus, it is possible to reduce a thickness of the battery by omitting the electrode active material layer that does not contribute to electrical performance of the battery.

In this case, single-sided electrodes are mounted on the first laminating stage 24 and the second laminating stage 25 at a start stage and at an end stage for producing the laminated electrode body 10. The single-sided electrode is, for example, the negative electrode. However, the single-sided electrode is not limited to the negative electrode, and may be the positive electrode.

Figure 5:
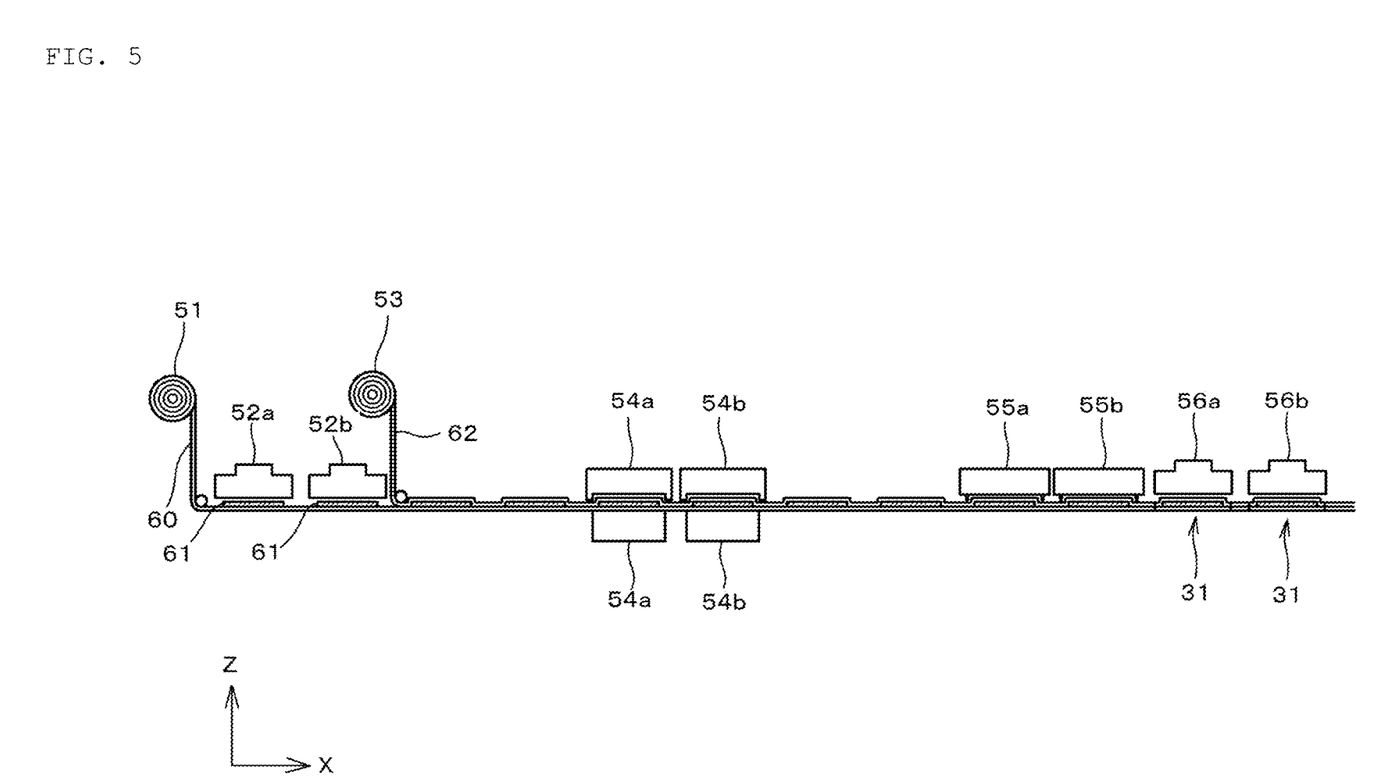
FIG. 5 is a diagram for describing steps from producing of a positive electrode packaged by separators to mounting of the positive electrode on a positive electrode mounting table positioned at a positive electrode mounting position.

FIG. 5 is a diagram for describing steps from the producing of the positive electrodes packaged by the separators to the mounting of the positive electrodes on the positive electrode mounting table 211 positioned at the positive electrode mounting position S1.

A first separator material feeding unit 51 unwinds a long first separator material 60 wound in a roll shape, and feeds the first separator material in one direction. However, the first separator material feeding unit 51 is configured to repeat a feeding operation and a stopping operation of the first separator material 60.

More specifically, the first separator material feeding unit 51 is configured to temporarily stop feeding the first separator material when the first separator material 60 is fed by a predetermined distance, and is configured to intermittently feed the first separator material 60 in one direction in a state of feeding the first separator material again by a predetermined distance. Here, as will be described below, since two positive electrodes 61 are mounted on the first separator material 60 at the same timing and the two positive electrodes 61 are bonded, cut, and transported, the feeding operation and the stopping operation of the first separator material 60 are performed such that the two positive electrodes 61 are bonded, cut, and transported at the same timing.

Electrode mounting units 52a and 52b carry the two positive electrodes 61 picked up at predetermined pickup positions, and mount the positive electrodes on the first separator material 60. The electrode mounting units 52a and 52b mount the two positive electrodes 61 when the first separator material 60 is stopped.

A second separator material feeding unit 53 unwinds a long second separator material 62 wound in a roll shape, and feeds the second separator material 62 in one direction in a state of covering the positive electrodes 61 mounted on the first separator material 60. The second separator material feeding unit 53 is configured to repeat a feeding operation and a stopping operation of the second separator material 62 in synchronization with the first separator material feeding unit 51.

Bonding units 54a and 54b bond the first separator material 60 and the second separator material 62 around the positive electrodes 61 sandwiched between the first separator material 60 and the second separator material 62. More specifically, the bonding units 54a and 54b have built-in heaters, respectively, and bond the positive electrodes 61 sandwiched between the first separator material 60 and the second separator material 62 to the first separator material 60 and the second separator material 62 around the positive electrodes 61 by a thermocompression bonding method of sandwiching and pressurizing the positive electrodes while heating the positive electrodes from upper sides and lower sides thereof.

The method of bonding the first separator material 60 and the second separator material 62 is not limited to the thermocompression bonding, and these separator materials may be bonded by a method other than the thermocompression bonding.

Cutting units 55a and 55b have cutting blades, respectively, and cut the first separator material 60 and the second separator material 62 around the positive electrode 61 by the cutting blades. Accordingly, the two positive electrodes 31 each having the structure of being sandwiched between the two separators are produced.

A long polyethylene terephthalate (PET) film may be supplied below the first separator material 60 at a position in front in a feeding direction of the separator material from positions at which the first separator material 60 and the second separator material 62 are cut by the cutting units 55a and 55b. In this case, the PET film functions as a carrier film for transporting the first separator material 60, the second separator material 62, and the positive electrodes 61, and functions as a underlay in the cutting of the first separator material 60 and the second separator material 62.

Each of transport units 56a and 56b sucks the positive electrode 31 having the structure of being sandwiched between the two separators, and transports the sucked positive electrode to the positive electrode mounting table 211 positioned at the positive electrode mounting position S1. For example, the transport unit 56a transports and mounts the positive electrode 31 onto the first positive electrode mounting table 211a, and the transport unit 56b transports and mounts the positive electrode 31 onto the second positive electrode mounting table 211b.

Second Embodiment

It has been described in the first embodiment that the positive electrodes 31 supplied to the positive electrode supply stage 21 each have the structure of being sandwiched between the separators arranged on the first main surface and the second main surface.

In contrast, in a second embodiment, the positive electrodes supplied to the positive electrode supply stage 21 each have a structure of being bonded to the separator arranged on the first main surface. The negative electrodes supplied to the negative electrode supply stage 22 each have a structure of being bonded to the separator arranged on the first main surface.

Figure 6:
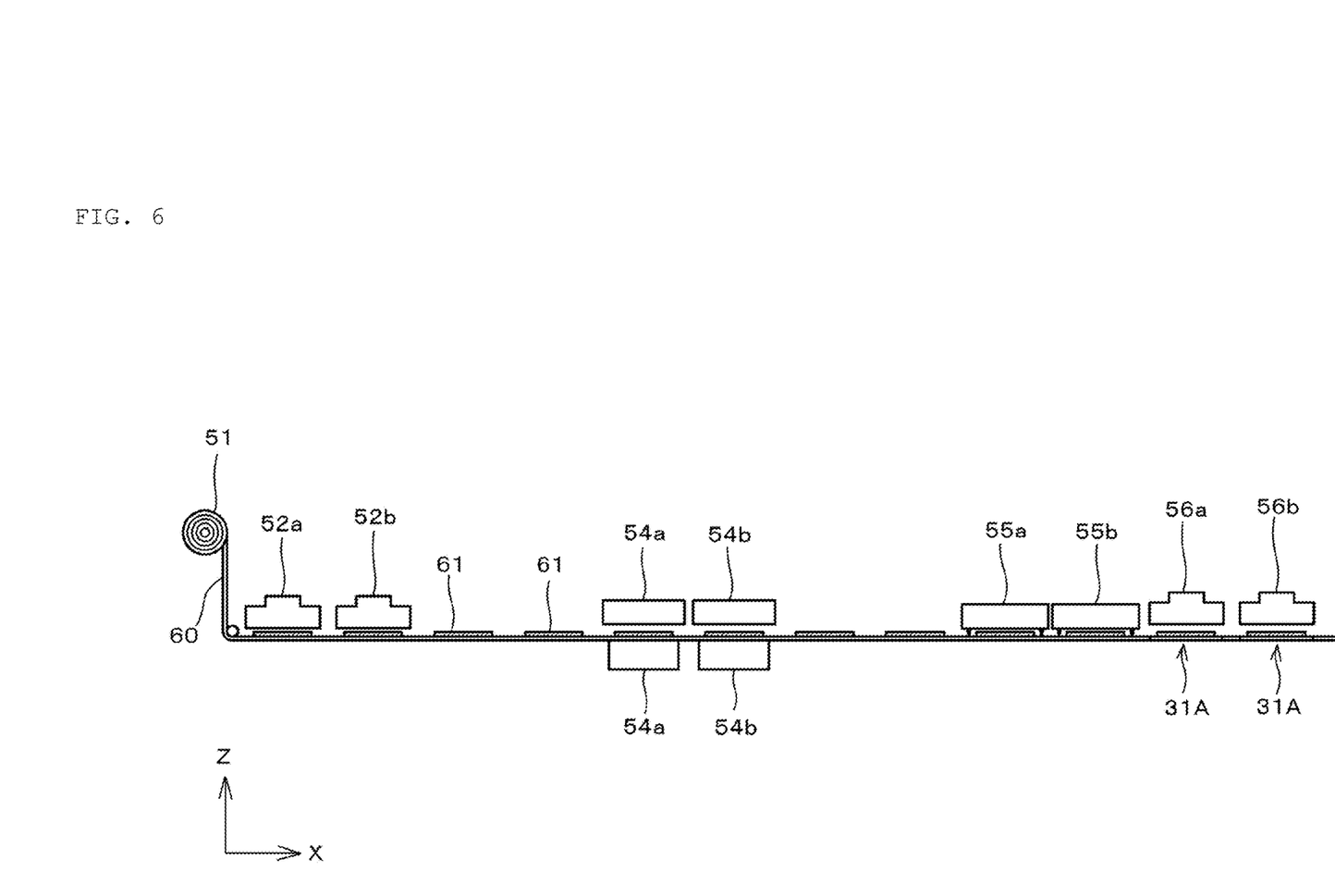
FIG. 6 is a diagram for describing steps from producing of the positive electrode bonded to the separator arranged on the first main surface to mounting of the positive electrode on the positive electrode mounting table positioned at the positive electrode mounting position.

FIG. 6 is a diagram for describing steps from the producing of the positive electrodes bonded to the separator arranged on the first main surface to the mounting of the positive electrodes on the positive electrode mounting table 211 positioned at the positive electrode mounting position S1. The same components as those illustrated in FIG. 5 are assigned by the same reference symbols, and detailed description thereof will be omitted.

As illustrated in FIG. 6, the bonding units 54a and 54b bond the positive electrodes 61 to the first separator material 60 by performing the thermocompression bonding while sandwiching the positive electrodes 61 mounted on the first separator material 60 from the upper side and the lower side thereof.

The cutting units 55a and 55b cut the first separator material 60 around the positive electrodes 61 by the cutting blades. Accordingly, two positive electrodes 31A bonded to the separator arranged on the first main surface are produced.

The transport units 56a and 56b suck the positive electrodes 31A bonded to the separator arranged on the first main surface, and transport the positive electrodes 31A to the positive electrode mounting table 211 positioned at the positive electrode mounting position S1. For example, the transport unit 56a transports and mounts the positive electrode 31A bonded to the separator onto the first positive electrode mounting table 211a, and the transport unit 56b transports and mounts the positive electrode 31A bonded to the separator onto the second positive electrode mounting table 211b.

Although not illustrated, the negative electrodes bonded to the separator arranged on the first main surface are also produced in the same manner, and are transported by the transport units to the negative electrode mounting table 221 positioned at the negative electrode mounting position S4.

According to the second embodiment, since the laminated electrode body 10 is manufactured by alternately laminating the positive electrodes bonded to the separator and the negative electrodes bonded to the separator, the displacement between the positive electrode and the separator and the displacement between the negative electrode and the separator can be suppressed, and the displacement between the positive electrode and the negative electrode in the case of being laminated can be suppressed.

(Method of Transporting Single-Sided Electrode)

As described above, the electrode positioned on the outermost side of the laminated electrode body 10 in the laminated direction can be the single-sided electrode in which the electrode active material layer is formed only on one side of the electrode current collector. In this case, it is necessary to mount the single-sided electrodes on the first laminating stage 24 and the second laminating stage 25 at the start stage and the end stage for producing the laminated electrode body 10. Here, it is assumed that the single-sided electrode is the negative electrode, and a method of supplying the single-sided negative electrode to the negative electrode supply stage 22 will be described.

Figure 7:
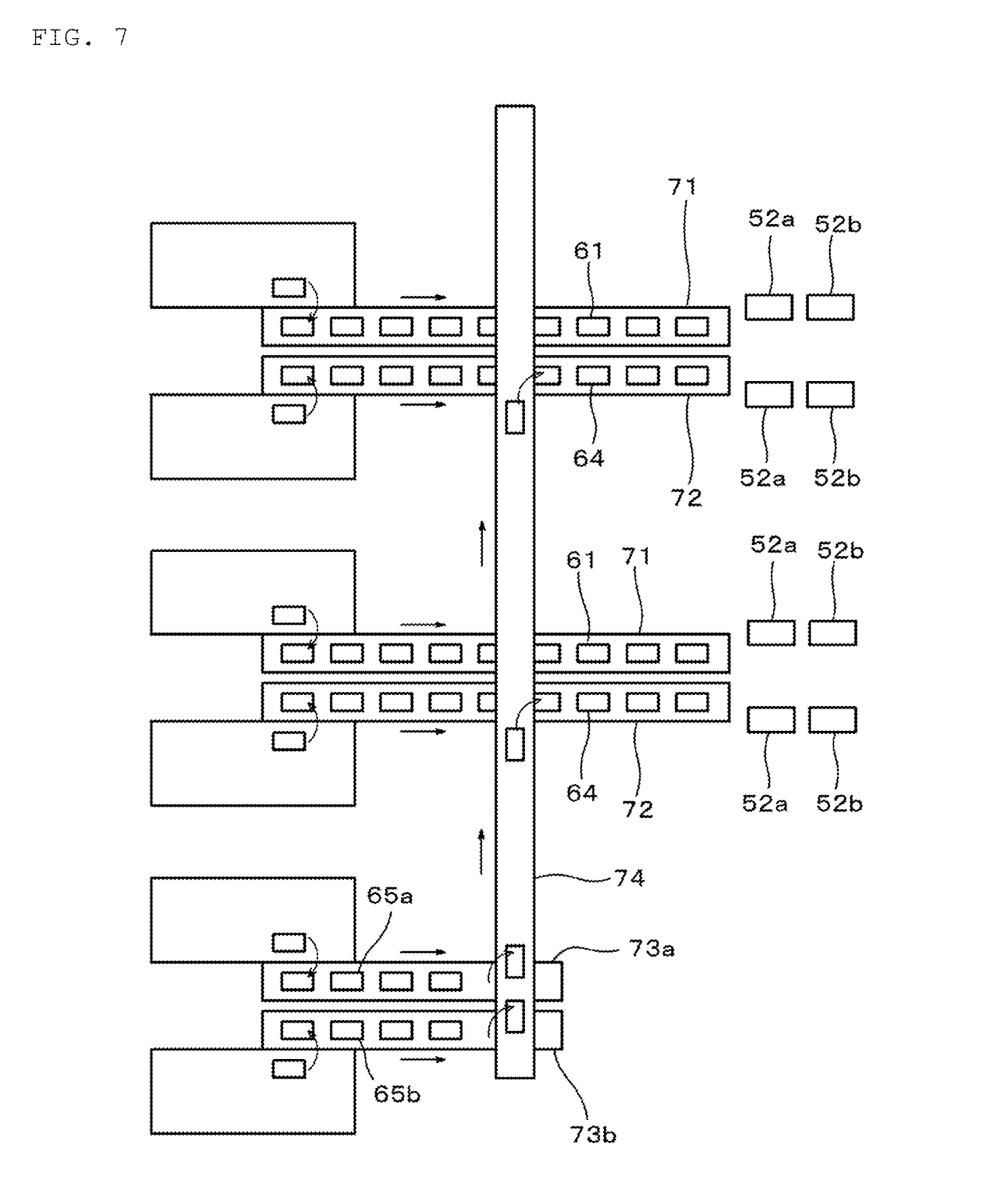
FIG. 7 is a diagram for describing a method of transporting a single-sided negative electrode.

As illustrated in FIG. 7, the positive electrodes 61 are produced at predetermined positions, and are carried by a positive electrode belt conveyor 71. The electrode mounting units 52a and 52b pick up the positive electrodes 61 on the positive electrode belt conveyor 71, and mount the positive electrodes on the long separator material as described above.

The same applies to the case of the negative electrode 64. That is, the negative electrodes 64 are produced at predetermined positions, and are carried by a negative electrode belt conveyor 72. The electrode mounting units 52a and 52b pick up the negative electrodes 64 on the negative electrode belt conveyor 72, and mount the negative electrodes on the long separator material as described above.

Although it has been described in FIG. 7 that two positive electrode belt conveyors 71 and two negative electrode belt conveyors 72 are provided, one positive electrode belt conveyor and one positive electrode belt conveyor may be provided, or three or more positive electrode belt conveyors and three or more belt conveyors may be provided.

Single-sided negative electrodes 65a arranged on one end side of the laminated electrode body 10 are produced at predetermined positions, and are mounted on a single-sided negative electrode belt conveyor 73a. Single-sided negative electrodes 65b arranged on the other end side of the laminated electrode body 10 are produced at predetermined positions, and are mounted on a single-sided negative electrode belt conveyor 73b.

The single-sided negative electrodes 65a on the single-sided negative electrode belt conveyor 73a and the single-sided negative electrodes 65b on the single-sided negative electrode belt conveyor 73b are transferred to a transfer belt conveyor 74, and are then carried to the negative electrode belt conveyors 72. The electrode mounting units 52a and 52b pick up the single-sided negative electrodes 65a and 65b on the negative electrode belt conveyor 72, and mount the single-sided negative electrodes on the long separator material as described above.

The single-sided negative electrodes 65a and 65b are mounted on the single-sided negative electrode belt conveyors 73a and 73b at a necessary timing, respectively, and are carried to the negative electrode belt conveyor 72 via the transfer belt conveyor 74.

However, the single-sided negative electrodes 65a and 65b may be mounted on the single-sided negative electrode belt conveyors 73a and 73b without considering the timing. In this case, the single-sided negative electrodes 65a and 65b carried while being transferred to the transfer belt conveyor 74 and the negative electrode belt conveyor 72 are temporarily stored at preliminary stages (not illustrated), and are picked up by the electrode mounting units 52a and 52b at a necessary timing. The preliminary stages are separately prepared for the single-sided negative electrode 65a and the single-sided negative electrode 65b.

Although it has been described that the single-sided electrode is the negative electrode, the same applies a case where the single-sided electrode is the positive electrode.

The present invention is not limited to the above-described embodiments, and various applications and modifications can be added within the scope of the present invention.

Although it has been described in the aforementioned embodiments that the electrode mounting units 52a and 52b are configured to mount the positive electrodes 61 on the first separator material 60 such that the positive electrodes 61 are arranged in one line, the positive electrodes 61 may be mounted so as to be arranged in two lines.

It has been described in the first embodiment that the laminated electrode body 10 is produced by alternately laminating the positive electrodes 31 each having the structure of being sandwiched between the two separators arranged on the first main surface and the second main surface and the negative electrodes 32. However, the laminated electrode body 10 may be produced by alternately laminating the positive electrodes and the negative electrodes each having the structure of being sandwiched between the two separators arranged on the first main surface and the second main surface.

It has been described in the aforementioned embodiments that the first suction head 231, the second suction head 232, the third suction head 233, and the fourth suction head 234 attached to the cross arm 230 transport the positive electrodes 31 or the negative electrodes 32 to the first laminating stage 24 or the second laminating stage 25 in a state of sucking the positive electrodes and the negative electrodes. However, the method of transporting the positive electrodes 31 or the negative electrodes 32 is not limited to the method of sucking and transporting the positive and negative electrodes.

It has been described in the aforementioned embodiments that the positive electrode 31 on the first positive electrode mounting table 211a positioned at the positive electrode mounting position S1 and the positive electrode 31 on the second positive electrode mounting table 211b are captured by the first image pickup unit 26. However, two image pickup devices may be provided, one image pickup device may capture the positive electrode 31 on the first positive electrode mounting table 211a, and the other image pickup device may capture the positive electrode 31 on the second positive electrode mounting table 211b. In this case, the two image pickup devices constitute the first image pickup unit of the present invention. The same applies to the capturing of the negative electrodes 32.

The position at which the first image pickup unit 26 captures the positive electrodes 31 is not limited to the positive electrode mounting position S1, and may be, for example, the positive electrode supply position S2 or may be a position between the positive electrode mounting position S1 and the positive electrode supply position S2 at which the positive electrode mounting table 211 moves. Similarly, the position at which the second image pickup unit 27 captures the negative electrodes 32 is not limited to the negative electrode mounting position S4, and may be, for example, the negative electrode supply position S5 or may be a position between the negative electrode mounting position S4 and the negative electrode supply position S5 at which the negative electrode mounting table 221 moves.

It has been described in the aforementioned embodiments that the positive electrode supply stage 21 includes the four sets of positive electrode mounting tables 211 each including the first positive electrode mounting table 211a and the second positive electrode mounting table 211b. However, the positive electrode supply stage 21 may include at least three sets of positive electrode mounting tables 211 such that the positive electrode mounting tables 211 are positioned at the positive electrode mounting position S1, the positive electrode supply position S2, and the positive electrode retracted position S3, respectively. Similarly, the negative electrode supply stage 22 may include at least three sets of negative electrode mounting tables 221 such that the negative electrode mounting tables 221 are positioned at the negative electrode mounting position S4, the negative electrode supply position S5, and the negative electrode retracted position S6, respectively.

DESCRIPTION OF REFERENCE SYMBOLS

10: Laminated electrode body
11: Positive electrode
12: Negative electrode
13: Separator
21: Positive electrode supply stage
22: Negative electrode supply stage
23: Laminating unit
24: First laminating stage
25: Second laminating stage
26: First image pickup unit
27: Second image pickup unit
31: Positive electrode having structure of being sandwiched between separators
32: Negative electrode
51: First separator material feeding unit
52a, 52b: Electrode mounting unit
53: Second separator material feeding unit
54a, 54b: Bonding unit
55a, 55b: Cutting unit
56a, 56b: Transport unit
60: First separator material
61: Positive electrode
62: Second separator material
71: Positive electrode belt conveyor
72: Negative electrode belt conveyor
73a, 73b: Single-sided negative electrode belt conveyor
74: Transfer belt conveyor
100: Apparatus for manufacturing laminated electrode body
211: Positive electrode mounting table
211a: First positive electrode mounting table
211b: Second positive electrode mounting table
221: Negative electrode mounting table
221a: First negative electrode mounting table
221b: Second negative electrode mounting table
230: Cross arm
231: First suction head
232: Second suction head
233: Third suction head
234: Fourth suction head

The invention claimed is:

1. An apparatus for manufacturing a laminated electrode body, the apparatus comprising:
a laminating unit that includes:
a rotatable cross arm having a rotation center;
a first transport head positioned at a first distance from the rotation center of the cross arm;
a second transport head facing the first transport head with the rotation center interposed therebetween and positioned at a second distance shorter than the first distance from the rotation center;
a third transport head arranged 90° around the rotation center relative to the first transport head and positioned at the first distance from the rotation center; and
a fourth transport head facing the third transport head with the rotation center interposed therebetween and positioned at the second distance from the rotation center;
a positive electrode supply stage that includes:
a first positive electrode mounting table positioned at the first distance from the rotation center of the cross arm when the positive electrode supply stage is positioned at a positive electrode supply position; and
a second positive electrode mounting table positioned at the second distance from the rotation center of the cross arm when the positive electrode supply stage is positioned at the positive electrode supply position;
a negative electrode supply stage that includes:
a first negative electrode mounting table positioned at the first distance from the rotation center of the cross arm when the negative electrode supply stage is positioned at a negative electrode supply position; and
a second negative electrode mounting table positioned at the second distance from the rotation center of the cross arm when the negative electrode supply stage is positioned at the negative electrode supply position;
a first laminating stage positioned at the first distance relative to the rotation center of the cross arm; and
a second laminating stage facing the first laminating stage with the rotation center of the cross arm interposed therebetween and positioned at the second distance relative to the rotation center of the cross arm,
wherein the laminating unit is configured such that after the first transport head picks up a first positive electrode on the first positive electrode mounting table and the second transport head picks up a second negative electrode on the second negative electrode mounting table, the cross arm rotates by 90° in a first direction, the first transport head mounts the first positive electrode on the first laminating stage, and the second transport head mounts the second negative electrode on the second laminating stage, and
the laminating unit is configured such that after the third transport head picks up a first negative electrode on the first negative electrode mounting table and the fourth transport head picks up a second positive electrode on the second positive electrode mounting table at positions where the first transport head mounts the first positive electrode on the first laminating stage and the second transport head mounts the second negative electrode on the second laminating stage, the cross arm rotates by 90° in a second direction opposite to the first direction, the third transport head mounts the first negative electrode on the first laminating stage, and the fourth transport head mounts the second positive electrode on the second laminating stage.

2. The apparatus for manufacturing the laminated electrode body according to claim 1, further comprising:
a first image pickup unit that captures the first positive electrode mounted on the first positive electrode mounting table and the second positive electrode mounted on the second positive electrode mounting table; and
a second image pickup unit that captures the first negative electrode mounted on the first negative electrode mounting table and the second negative electrode mounted on the second negative electrode mounting table,
wherein the first laminating stage is configured to be movable in at least one of a horizontal direction and a rotation direction based on an image of the first positive electrode mounted on the first positive electrode mounting table captured by the first image pickup unit and based on an image of the first negative electrode mounted on the first negative electrode mounting table captured by the second image pickup unit, and
the second laminating stage is configured to be movable in at least one of the horizontal direction and the rotation direction based on an image of the second positive electrode mounted on the second positive electrode mounting table captured by the first image pickup unit and an image of the second negative electrode mounted on the second negative electrode mounting table captured by the second image pickup unit.

3. The apparatus for manufacturing the laminated electrode body according to claim 2,
wherein the positive electrode supply stage includes a first light irradiation mechanism that applies light from below the first positive electrode mounted on the first positive electrode mounting table and the second positive electrode mounted on the second positive electrode mounting table,
the negative electrode supply stage includes a second light irradiation mechanism that applies light from below the first negative electrode mounted on the first negative electrode mounting table and the second negative electrode mounted on the second negative electrode mounting table,
the first image pickup unit is arranged above the positive electrode supply stage, and
the second image pickup unit is arranged above the negative electrode supply stage.

4. The apparatus for manufacturing the laminated electrode body according to claim 1,
wherein one of the first positive electrode mounted on the first positive electrode mounting table, the second positive electrode mounted on the second positive electrode mounting table, the first negative electrode mounted on the first negative electrode mounting table, and the second negative electrode mounted on the second negative electrode mounting table is sandwiched between a pair of separators.

5. The apparatus for manufacturing the laminated electrode body according to claim 1,
wherein the first positive electrode mounted on the first positive electrode mounting table and the second positive electrode mounted on the second positive electrode mounting table each have a structure that includes a first separator arranged on a first main surface thereof, and the first negative electrode mounted on the first negative electrode mounting table and the second negative electrode mounted on the second negative electrode mounting table each have a structure that includes a second separator arranged on a first main surface thereof.

6. The apparatus for manufacturing the laminated electrode body according to claim 1,
wherein at least one of (1) the first and second positive electrodes and (2) the first and second negative electrodes are single-sided electrodes having an electrode active material layer only on one surface of an electrode current collector.

7. The apparatus for manufacturing the laminated electrode body according to claim 1,
wherein the positive electrode supply stage includes three or more sets of the first positive electrode mounting tables and the second positive electrode mounting tables, and is configured to rotate each of the three or more sets of the first positive electrode mounting tables and the second positive electrode mounting tables to the positive electrode supply position, and
the negative electrode supply stage includes three or more sets of the first negative electrode mounting tables and the second negative electrode mounting tables, and is configured to rotate three or more sets of the first negative electrode mounting tables and the second negative electrode mounting tables to the negative electrode supply position.

* * * * *